Patented Apr. 19, 1927.

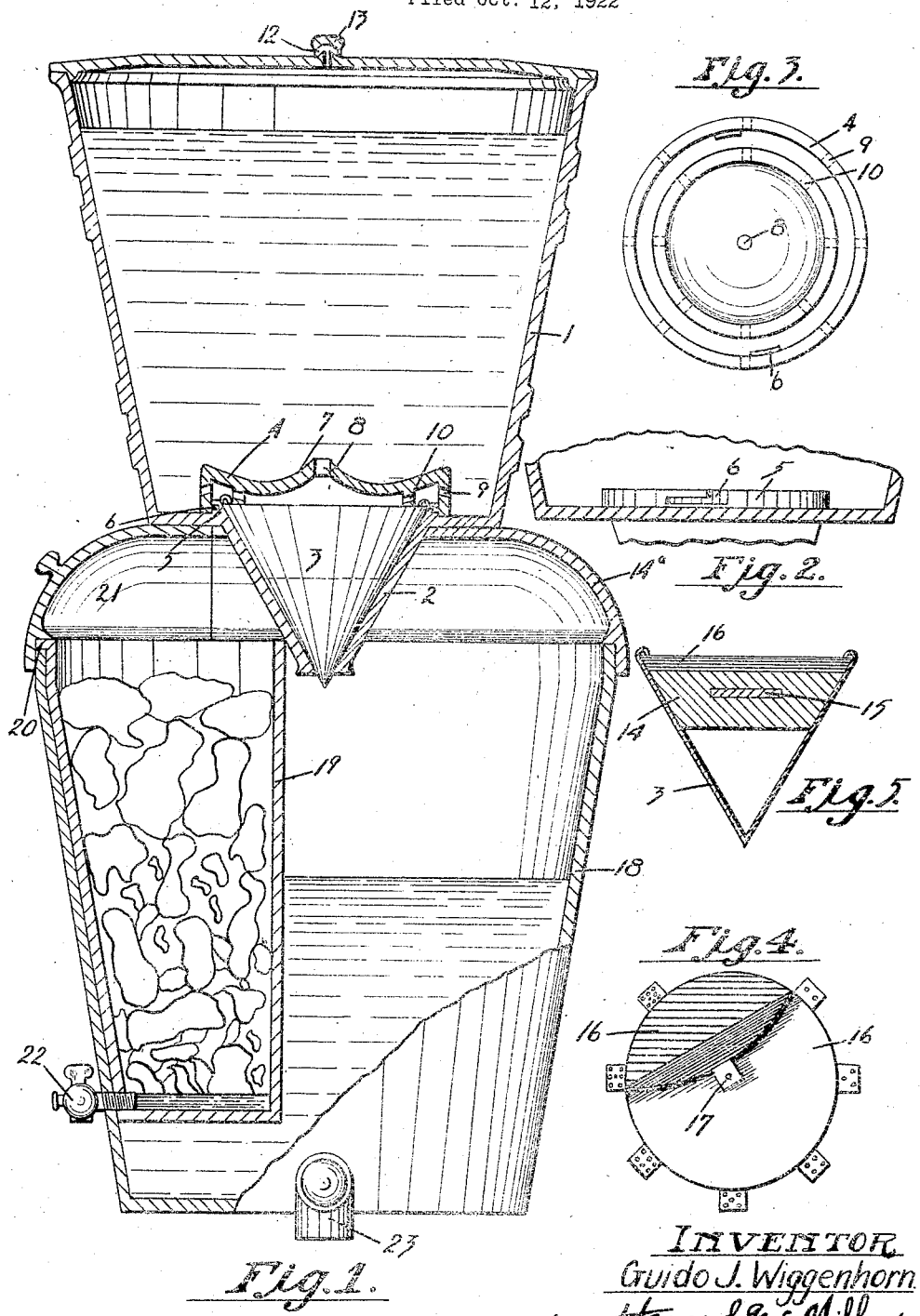

1,625,442

UNITED STATES PATENT OFFICE.

GUIDO J. WIGGENHORN, OF LOS ANGELES, CALIFORNIA.

FILTER.

Application filed October 12, 1922. Serial No. 593,972.

This invention relates to an improvement in filters, and more particularly to what may be termed small utility filters, suitable for use in private homes, offices and the like.

One object of my invention is the production of a filter which shall be highly efficient not only in the removal of sediments but also in the destruction of germs. Other objects of my invention are the convenient association of my preferred filtering means with suitable means for cooling the water purified and the providing of a filter of inexpensive construction which shall require no expert care. Among the objects of my invention are also the providing of an improved renewable filtering and purifying unit, my preferred construction being such as to permit the free movement of air to and from the point near the top of a water receiving receptacle, and also free withdrawal of cool and purified water from a point near the bottom of a main receptacle adapted to contain water that has been purified and cooled.

Other objects of my invention will appear from the following description and the claims appended thereto.

In the accompanying drawings,

Figure 1 is a front view or elevation, with parts broken away.

Fig. 2 is a diagrammatic vertical section showing a detail of a preferred construction of the bottom of the receiving receptacle.

Fig. 3 is a bottom view of a sluice cap adapted to be fitted over the parts shown in Fig. 2.

Fig. 4 shows a preferred arrangement of sheets of filtering material substantially as assembled in my preferred form of renewable filtering unit.

Fig. 5 is a vertical section of one form of such renewable filtering unit.

Referring specifically to the drawings, 1 is the receiving receptacle within which is placed the water to be purified, the bottom of this receptacle being preferably provided with a tapering outlet 2, within which is shown the renewable filtering unit 3. Above this unit, and in a position to protect it from mechanical injury when water is poured into the receptacle 1, is shown a sluice plate 4, which may be secured in position upon the rim 5, shown as integral with the receptacle 1, by means of a bayonet joint 6, or equivalent means. In order to facilitate the collection of sediments in the bottom of the receptacle 1, the sluice plate 4 is shown as provided with a circular depression 7 in its top, there being an opening 8 for bubbles substantially in the center of said plate and lateral openings 9 for the descent of water through its sides. Openings, such as are shown at 10, may be left in the reinforcing ring in the bottom of the sluice plate to permit the water to pass freely to the renewable unit 3 and descend therethrough.

The receiving receptacle 1 is herein shown as tapering toward the bottom, one object of this construction being to facilitate the nesting of these units when in storage. In use a suitable cover should be employed, preferably provided with my preferred means for admitting air as by openings 12 through the knob 13.

After depositing its sediment upon the sluice plate 4 and the bottom of the receptacle 1, water that has passed through the openings 9 and 10 must pass through the renewable unit 3, the configuration of which should be such that it shall fit snugly within the tapered outlet 2, the conical form shown being especially convenient and advantageous in securing reliable fit. This conical unit should preferably comprise an element 14 which I prefer to form of a synthetic plastic material, such as one part of Portland cement and five parts of sand, and in this porous material I find it advantageous to embed a pad 15 containing a germicidal agent, such as chloride of lime absorbed in or mixed with comminuted filter paper, this being adapted to effect a gradual and moderate chlorination of the water passing therethrough. To complete the renewable unit 3, the apex of its conical body may be filled with e. g. apricot pit char, and I prefer to provide separate sheets 16 of filter paper or equivalent material upon the top of the block 14, these being shown as provided with structural or other means, such as separate tabs 17, each bearing identification marks, to indicate its relative position. For example, the tab of the uppermost layer may be provided with a single perforation, the tab of the second layer being provided with two perforations, and so forth, in order that the uppermost sheet may be identified and separately removed after sediment has collected thereon, this operation being repeated as often as necessary. Other media may be substituted for char in 3.

In the embodiment shown there are eight tabs, corresponding to eight sheets of filter paper, the successive removal of which should suffice to keep a unit in satisfactory condition during several weeks or months of continuous use. Surrounding the block 14 and the sheets of porous material thereon I prefer to employ a jacket of pervious material which may be crimped or otherwise secured over the edges of the sheets 16 in order to facilitate the storage and handling of the units 3, which may be regarded as separate and complete articles of merchandise.

Below the receptacle 1 and the fitering unit 3, any suitable means for collecting the purified water may be provided, but I prefer to employ an olla or similar receptacle 18 which may be provided with a tight cover 14 and with an ice receiving receptacle 19. In the embodiment shown, this ice receiving receptacle is provided with a flange 20 fitting upon the top of the olla, and it is provided with a sliding cover 21, to facilitate the supply of ice for the filling of the ice chamber. A suitable drain cock 22 is preferably provided at or near the bottom of the ice chamber, and a separate cock or faucet 23 is provided for the withdrawal of the cold and purified water after it is collected in the olla or glazed receptacle 18.

Handles (not shown) may be provided upon the respective receptacles as desired, and supports may be added. Tho I have herein described in full detail only one form of my invention, pointing out certain novel features in the appended claims, it will be understood that various features of my device may be used independently of the associations in connection with which they are herein described and also that various changes or modifications may be made therein without departure from the spirit and scope of the present invention.

The process of water purification incidently described herein is not herein claimed, this being the subject matter of my separate application Serial No. 593,973, filed October 12, 1922.

What is claimed is:

1. In a filter comprising a receiving reservoir and a main receptacle separated therefrom, a renewable porous unit adapted to be interposed between said reservoir and said receptacle, said unit comprising a germicidal agent incorporated in a synthetic composition and surrounded by a pervious jacket adapting the same to be inserted in its entirety.

2. In a filter, a renewable filtering unit comprising a block having a germicidal substance incorporated therein, and separately renewable layers of a porous purifying material thereon.

3. In a filter, a renewable filtering unit comprising a block having a germicidal substance incorporated therein, separately renewable layers of a porous purifying material thereon, and a uniting jacket of pervious material securing said layers to said block.

4. A filter comprising a main receptacle having an aperture in its top, a receiving reservoir mounted upon said main receptacle having an outlet integral therewith and extending downwardly through said aperture, a sluice cap mounted above said outlet, a replaceable filtering unit disposed within said outlet capable of being removed and replaced as an entirety, said filtering unit including a porous element within which is disposed a germicidal agent, and removable filter papers secured above said element.

5. A filter comprising a main receptacle having an aperture in its top, a receiving reservoir mounted upon said main receptacle having an outlet secured to the bottom thereof adapted to extend downwardly through said aperture, a renewable filtering unit disposed within said outlet adapted to be removed and replaced as an entirety, said unit including a container in which is disposed a germicidal agent, and removable filter papers carrying identification tabs mounted above said germicidal agent.

6. A filter comprising a main receptacle having an aperture in its top, a receiving reservoir mounted upon said main receptacle having an outlet secured to the bottom thereof adapted to extend downwardly through said aperture, a renewable filtering unit disposed within said outlet adapted to be removed and replaced as an entirety, said unit including a container in which is disposed a germicidal agent, and a compartment defined in said container for holding carbon particles.

7. A renewable filtering unit for filters comprising a pervious container, a porous element mounted in said container containing a germicidal agent, and carbon particles disposed beneath said element.

8. A renewable filtering unit for filters comprising a pervious container, a porous element mounted in said container containing a germicidal agent, and removable filter papers disposed above said element.

9. A renewable filtering unit for filters comprising a pervious container, a porous element mounted in said container containing a germicidal agent, removable filter papers disposed above said element, and identification tabs carried by said filter papers.

10. A removable filtering unit for filters comprising a pervious container, comminuted carbon particles disposed within said container, and removable filter papers bearing identification tabs disposed above said carbon particles.

11. A filter comprising a main receptacle, a receiving reservoir mounted on said main receptacle, means providing an outlet leading from said receiving reservoir into said main receptacle, a renewable filtering unit disposed in said outlet, said filtering unit comprising a container, a porous element disposed within said container containing a germicidal agent, removable filter papers mounted on said container above said element, and a filtering material disposed in said container below said element.

12. A filtering unit for filters comprising a container, an element mounted in said container containing a germicidal agent, detachable filter papers mounted in superposed relation above said element, and a filtering material disposed below said element.

In testimony whereof I have signed my name to this specification.

GUIDO J. WIGGENHORN.